April 22, 1952     E. W. HEROLD     2,594,167
ULTRAHIGH-FREQUENCY BRIDGE CIRCUITS
Filed July 30, 1948     4 Sheets-Sheet 1

INVENTOR
EDWARD W. HEROLD
BY
ATTORNEY

April 22, 1952  E. W. HEROLD  2,594,167
ULTRAHIGH-FREQUENCY BRIDGE CIRCUITS
Filed July 30, 1948  4 Sheets-Sheet 2
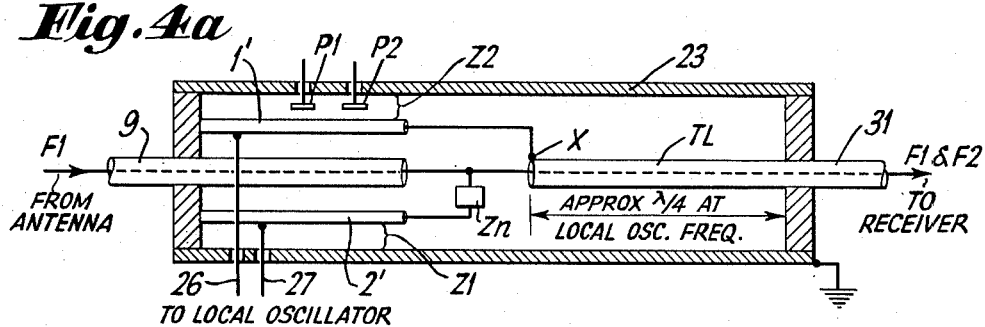
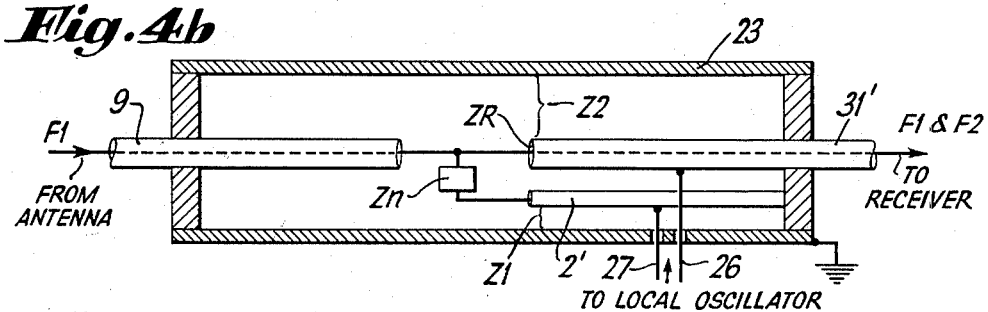
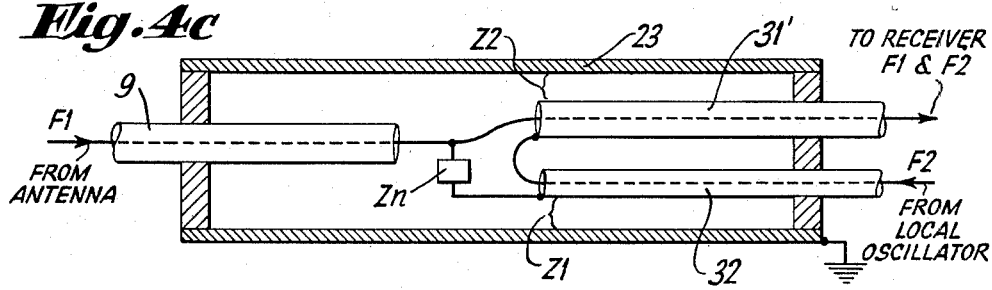
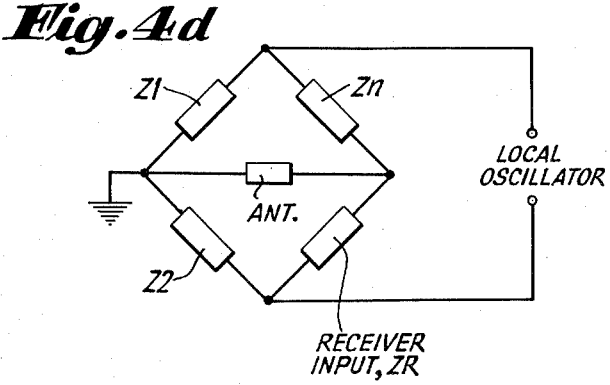
INVENTOR
EDWARD W. HEROLD
BY
ATTORNEY April 22, 1952  E. W. HEROLD  2,594,167
ULTRAHIGH-FREQUENCY BRIDGE CIRCUITS
Filed July 30, 1948  4 Sheets-Sheet 3
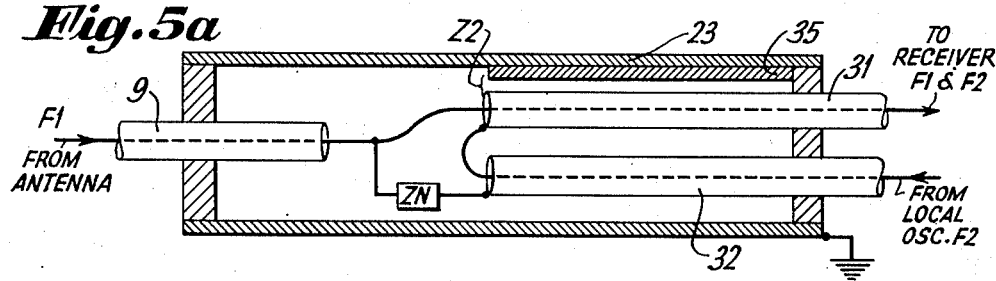
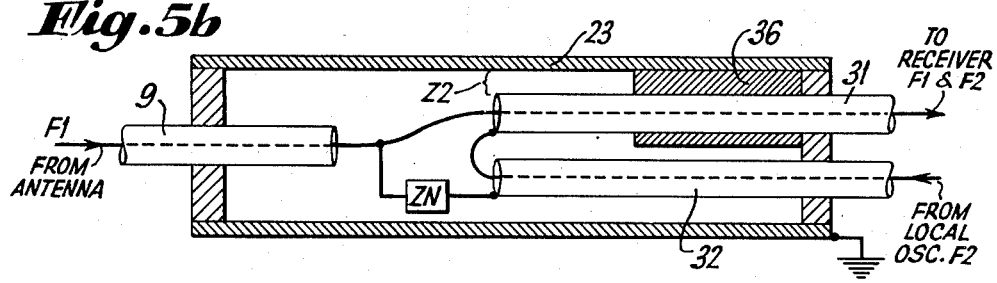
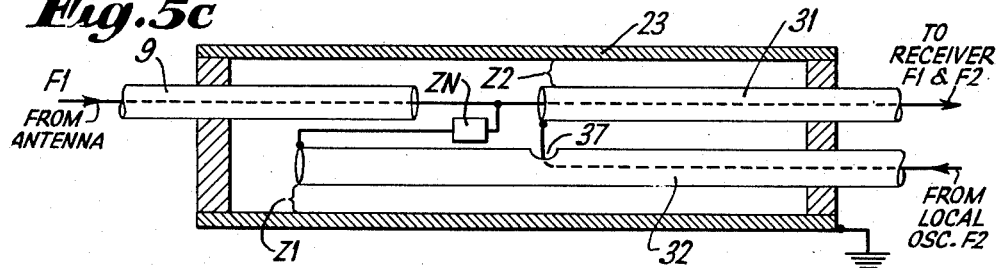
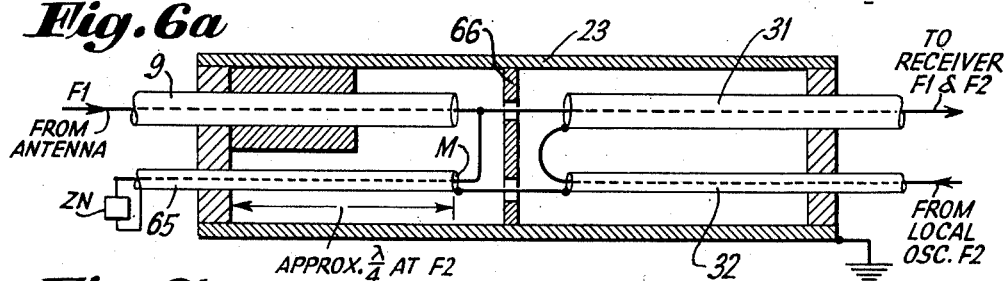
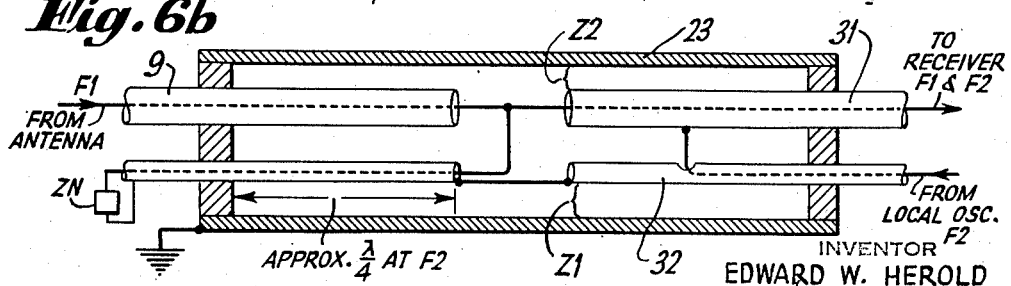
INVENTOR
EDWARD W. HEROLD
BY
ATTORNEY April 22, 1952      E. W. HEROLD      2,594,167
ULTRAHIGH-FREQUENCY BRIDGE CIRCUITS Filed July 30, 1948      4 Sheets-Sheet 4

INVENTOR
EDWARD W. HEROLD
BY
ATTORNEY

Patented Apr. 22, 1952

2,594,167

UNITED STATES PATENT OFFICE 2,594,167

ULTRAHIGH-FREQUENCY BRIDGE CIRCUITS

Edward W. Herold, Kingston, N. J., assignor to Radio Corporation of America, a corporation of Delaware Application July 30, 1948, Serial No. 41,473

23 Claims. (Cl. 178—44)

This invention relates generally to bridge circuits for use at ultra-high frequencies, and more particularly to such circuits capable of use between an antenna and a superheterodyne receiver for preventing local-oscillator radiation.

In ultra-high-frequency receivers, in which the first tube is a mixer or frequency converter, it is often necessary to apply both the signal and oscillator voltages to the same pair of electrodes in the mixer tube (e. g. cathode and control grid). As a result, it is often found that appreciable amounts of local-oscillator power are radiated from the receiving antenna. This is undesirable because it creates objectionable interference with other receivers and, in military applications, may disclose the presence and the location of the radiating receiver.

At low radio frequencies up to perhaps 50 megacycles, it is known to use circuits which are essentially bridges and which employ lumped circuit constants for canceling out the local oscillator radiation. Two such known circuits are shown in Figs. 1a and 1b. In Fig. 1a, the antenna is coupled to a tuned circuit which is connected across a grid and a cathode of a mixer tube. The tuned circuit is composed of two lumped inductors A and B in series, or a single inductor tapped at an appropriate point and the normal tuning condenser in shunt. The dotted line capacitor $C_1$ is the grid-to-cathode interelectrode capacitance, while condenser $C_n$ is a neutralizing capacitance. The local-oscillator voltage is injected into the cathode circuit. In a different arrangement shown in Fig. 1b, however, the local oscillator is symmetrically coupled to a tapped inductor A' and B' (which can also be inductors arranged in series) in the cathode circuit of the mixer tube, while the antenna is coupled to a parallel tuned circuit connected between the grid and the junction points of inductors A and B. The circuit equivalents of Figs 1a and 1b, drawn as bridges, are shown in Figs. 2a and 2b respectively. It should be noted that when neutralizing capacitor $C_n$ is correctly adjusted, no local-oscillator power can get to the antenna although both the local-oscillator voltage and the signal from the antenna are impressed on the mixer input (capacitance $C_1$).

At ultra-high frequencies where the wavelength becomes comparable to the physical dimensions of the components, it is not possible to use lumped circuits of the type shown in Figs. 1a and 1b. Accordingly, a general object of the present invention is to provide a frequency insensitive ultrahigh-frequency circuit which is capable of passing energy of two frequencies without reaction between the sources from which energies emanate. A more specific object is to enable the simultaneous injection of signal and local-oscillator voltages into the mixer circuit of a superheterodyne receiver with no undesired radiation from the local oscillator, i. e. to enable the antenna and local oscillator to be both coupled to the same input terminals of a receiver but not coupled to each other. A further object is to provide means for eliminating the radiation which is also applicable to any type of mixer or converter system, e. g. a silicon crystal, which is likely to be used at ultra-high frequencies.

In accordance with several embodiments of the invention, these objects are attained by bridge circuit arrangements making use of conducting stubs in a closed metal box. These bridge circuit arrangements are adapted for insertion between an antenna and a receiver so as to permit antenna signal voltage and local-oscillator voltage to reach the receiver, while preventing local-oscillator power from reaching the antenna. The stubs of the bridge circuits of the invention are conveniently formed by extensions of the coaxial lines leading to the receiver, local oscillator, etc. In order to prevent loss of signal power by the bridge circuit, there may be used unequal-ratio-arm bridge arrangements which reduce this loss substantially.

A detailed description of the invention follows in conjunction with a drawing, wherein:

Figs. 4a, 4b and 4c are three different bridge circuits of the present invention, for use at ultra high frequencies, employing conducting stubs and a neutralizing impedance located within an electrically closed metallic chamber.

Fig. 4d is the electrical circuit equivalent for the bridge circuits of Figs. 4a to 4c;

Figs. 5a, 5b and 5c are additional embodiments of bridge circuits of the present invention, for use at ultra high frequencies;

Figs. 6a, 6b, 7a and 7b illustrate additional embodiments of bridge circuits of the invention, wherein neutralizing impedances are located externally of the electrically closed metallic chamber but connected to the interior of the chamber by coaxial lines;

Throughout the figures of the drawings, the same or equivalent parts are designated by the same reference characters.

Figure 1A:
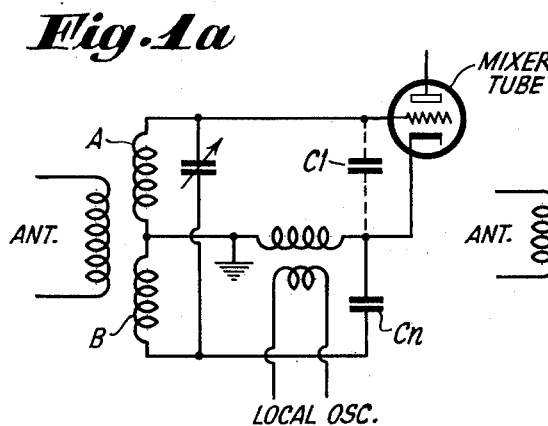
Figs. 1a and 1b illustrate known bridge circuits employed at relatively low frequencies.
Figure 1B:
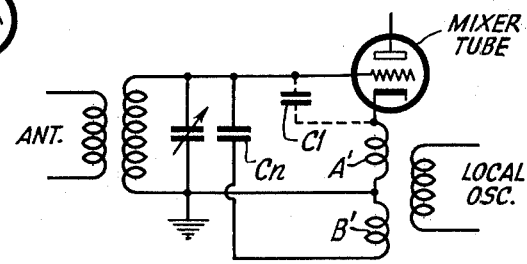
Figure 2A:
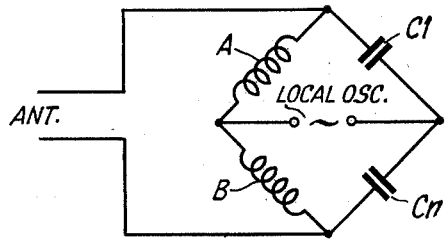
Figs. 2a and 2b are the electrical circuit equivalents of the known bridge circuits of Figs. 1a and 1b, respectively.
Figure 2B:
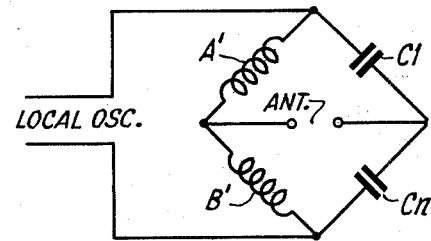
Figure 3:
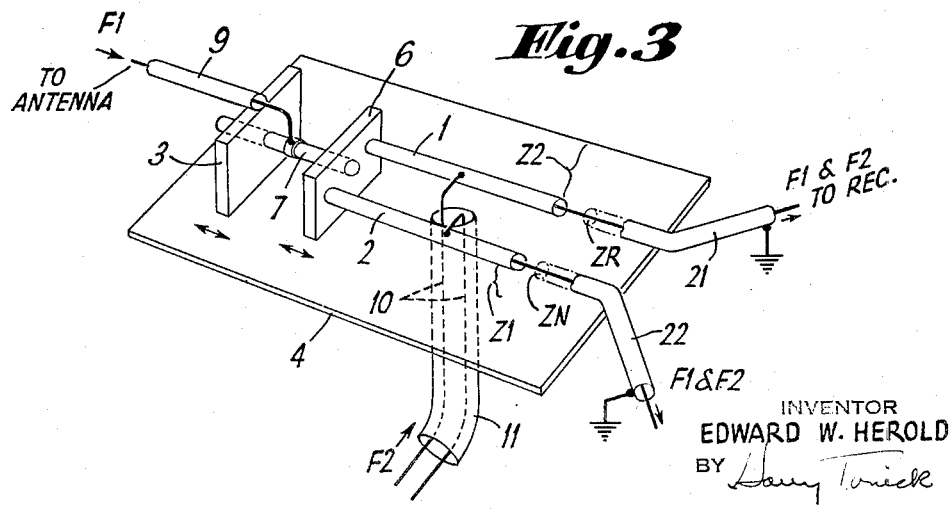
Fig. 3 illustrates a novel circuit arrangement for use at ultra high frequencies which is a modification of the mixer circuits disclosed in my copending application, Serial No. 458,189, filed September 14, 1942, now Patent No. 2,516,990 issued August 1, 1950.

Fig. 3 shows one embodiment of the invention which is a modification of the circuits disclosed in my copending application Serial No. 458,189. This figure shows an ultra-high-frequency bridge circuit capable of insertion between the antenna and the superheterodyne receiver, with none or negligible radiation from the local oscillator through the antenna. In Fig. 3, the local oscillator for the receiver, having a frequency F2 is shown coupled through a balanced shielded transmission line consisting of two spaced leads 10 surrounded by a shield 11, to a section of line comprising separate rod-like conductors 1 and 2 which are equal in length and physically parallel to each other. The connections of leads 10 and 11 are preferably adjustable over the lengths of conductors 1 and 2 to enable proper coupling therebetween. The rod-like conductors 1 and 2 are short-circuited at one end by a metallic bar 6 which is spaced from metal base plate 4 and is slidable along the conductors 1, and 2 for tuning the same. The center of bar 6 is connected by a metallic rod 7 to a metallic block 3, in turn, mounted on a grounded metal base plate 4. The incoming signals of a frequency F1 from the antenna are supplied through coaxial line 9 to an adjustable tap on rod 7. Both block 7 and shorting bar 6 are individually movable or adjustable in the directions of the bi-directional arrows.

The open end of conductor 1 is connected to the inner conductor of a coaxial line 21 extending to the receiver, while the open end of conductor 2 is connected to the inner conductor of a coaxial line 22 extending to a second receiver or a termination similar to the receiver input impedance.

In effect, the antenna is coupled in parallel (cophasal relation) to both rods 1, 2 through line 9. Conductors 1 and 2, considered from bar 6 to the open ends, constitute a tuned circuit whose resonance frequency depends upon the linear length of these conductors between bar 6 and the coaxial lines 21 and 22. Both conductors 1 and 2, however, considered in parallel or as a unit from the open ends to the block 3 may be looked at as a single conductor and these together with base plate 4 constitute another tuned circuit having a resonance frequency depending primarily upon the linear length of the parallel conductors 1 and 2 between the block 3 and the coaxial lines 21, 22. The short-circuiting bars 6 and 3 thus provide independent adjustments of the two resonance frequencies of the transmission line circuit.

In Fig. 3, the receiver connected to coaxial line 21 has both resistive and reactive components which may be represented by RN and CN, respectively, constituting a network. The second receiver, or an equivalent dummy network simulating the receiver input, is connected to coaxial line 22 and also has resistive and reactive components RN and CN, and, if both terminations for coaxial lines 21 and 22 are identical, a balance will be inherently maintained. The energies supplied by the line section comprising rods 1, 2 to the coaxial lines 21 and 22 have frequencies F1 and F2. It should be noted, however, that half the signal power is consumed in the second receiver or neutralizing impedance. This loss in signal power can be avoided by changing the tapping points and surge impedances so as to make an unequal-ratio-arm bridge circuit. Although the circuit arrangement of Fig. 3 is suitable for insertion between the antenna and the receiver input, it is not as advantageous for use at ultra-high frequencies as the circuits to be hereinafter described, either for equal or unequal ratio arms of the bridge circuit.

Figs. 4a, 4b and 4c show three embodiments of bridge circuits in accordance with the invention employing metallic enclosures, for use at ultra-high frequencies, and which are suitable for cancelling local oscillator radiation in a superheterodyne receiver. In Fig. 4a the inner conductor of the coaxial line 9 from the antenna is connected directly to the inner conductor of a coaxial line 31 going to the receiver. Both coaxial lines 9 and 31 are mounted in a grounded metal enclosure 23 in such a way that an appreciable portion of their outer conductors extend into the enclosure. The receiver coaxial line 31 extends into the metal enclosure for a distance of approximately one-quarter of a wavelength ($\lambda/4$) at the frequency F2 of the local oscillator. The local-oscillator voltage is applied in balanced fashion over leads 26, 27 to a pair of equal length and equal dimensioned rod-like conductors 1' and 2' positioned symmetrically on opposite sides of the antenna coaxial line. The impedance Zn is connected between one side 27 of the local oscillator and the inner antenna lead of coaxial line 9, while the receiver impedance (as represented by the coaxial line 31 leading to it), is connected between the other side 26 of the local oscillator and the same inner antenna lead of coaxial line 9. The $\lambda/4$ projection of the receiver coaxial line 31 into the enclosure 23 provides a high impedance at point X and prevents either side of the receiver input from being short-circuited to ground. The equivalent electrical circuit is shown in Fig. 4d in which Z1 and Z2 represent the impedances of the parallel-rod oscillator conductors 1' and 2' to ground (i. e. to the enclosure). In Fig. 4a, the symmetry indicates Z1=Z2 so that the bridge is balanced if Zn is made equal to the receiver input impedance ZR as seen at the end X of its coaxial cable 31. Ordinarily it will be more convenient to correctly balance the bridge by minor adjustment of Z1 or Z2 than by a change in Zn. Such minor adjustment may be made by an adjustable metal plunger to change the reactive balance and a second plunger of resistive material to change the resistive balance on whichever half of the circuits need the trimming. Such plungers are designated as P1 and P2. Plunger P1 is a plunger having lossy material to change the resistive balance. The neutralizing impedance Zn may consist of a small resistance with an appropriate arrangement of leads to provide the correct neutralizing reactance whether capacitance or reactance, if any is needed. Because the bridge is essentially one which has equal-ratio-arms, half the signal power is lost in Zn.

The need for the $\lambda/4$ section of coaxial line 31 within the metal enclosure 23 is eliminated in the circuits of Figs. 4b and 4c in which the local oscillator impedances Z1 and Z2 are obtained by building up voltage on the outside of the receiver coaxial line. Thus the projections of the coaxial lines 9 and 31' into the enclosure 23 of Figs. 4b and 4c are not critical in length. Furthermore, it is now possible to alter the bridge so as to make the ratio-arms unequal and prevent loss of half of the signal power in the neutralizing impedance. To provide maximum signal on the receiver, Z1 and Zn should be made large compared with their counterparts Z2 and the receiver impedance ZR. In Fig. 4b this is done by using a small diameter rod 2' for the Z1 side of the local-oscillator circuit, whereas the large diameter outer conductor of the receiver coaxial line 31' forms the other half of the oscillator circuit, i. e. Z2. In Fig. 4c, the local oscillator voltage is introduced through another coaxial line 32. By making this coaxial line 32 of smaller diameter than the receiver coaxial line 31', an unequal-arm bridge can again be achieved. The impedances Z1 and Z2 are formed by the projections of the outer conductors of the receiver and the local oscillator coaxial lines 31' and 32' into the metal box 23.

Other arrangements of the invention for changing the ratio-arms of the ultra high frequency bridge circuit are shown in Figs. 5a, 5b and 5c. In Fig. 5a, instead of raising the surge impedance (and hence raising Z1) of the local oscillator projection by reducing its diameter (as suggested for Fig. 4c), this diameter is held constant but the surge impedance of the Z2 conductor is lowered by the closely-spaced metal piece 35 shown joined to the inside of metal enclosure 23. Thus impedance Z2 is reduced and, to achieve a balance in the bridge circuit, ZN must be raised. Once again, I have avoided the appreciable loss of signal power which occurs in the equal-arm-ratio type of bridge. In Fig. 5b, the ratio-arms are changed by making the Z2 arm effectively shorter than the Z1 arm, using a metal block 36 around the receiver coaxial line 31 to shorten its projection into the enclosure. A similar result is achieved in Fig. 5c by making the Z1 projection longer. The local oscillator drive for Z2 is taken from a hole 37 in the side of the coaxial line 32. Other methods of altering the relative impedances of Z1 and Z2 are equally applicable and can be devised by those skilled in the art from an understanding of the principles of the present invention.

In the circuits of Figs. 4a to 5c inclusive, a neutralizing impedance Zn in the form of a lumped element is shown diagrammatically by a box. This element may be a resistor, an extremely fine (Wollaston) resistance wire or any other suitable impedance which will balance the bridge. As heretofore mentioned, it will ordinarily be simpler to balance the bridge by adjustments made on Z1 or Z2, or both rather than on adjustment of Zn. However, in many instances, it will be advantageous to make the balancing adjustment external to the metallic enclosure 23. Furthermore, at frequencies above 1500 megacycles or so, it becomes difficult to use any form of lumped element such as I have shown for Zn. Again, when the receiver impedance as seen from the end of its coaxial line varies rapidly with frequency, it is not simple to neutralize over a wide band with a lumped element. In order to overcome these objections to the circuits of Figs. 4a to 5c inclusive, there are shown in Figs. 6a, 6b, 7a and 7b other embodiments of the invention wherein the impedance Zn is external of the metallic enclosure 23 and, therefore, may be a section of transmission line, a cavity, or any other impedance readily adapted for use at ultra-high frequencies.

In Figs. 6a and 6b are shown two circuits which introduce the neutralizing impedance Zn into metal box 23 through a coaxial line 65 extending into the metal enclosure 23. The extension of line 65 into the enclosure 23, since it is effectively across impedance Z1, modifies Z1 and must be taken into account in the balanced conditions of the bridge. If the extension is approximately a quarter wavelength at local oscillator frequency, then this modification is negligible because the open end M of this extension is a point of high impedance at the operating frequency. This effectively keeps both sides of the Zn impedance, as seen at the end of its coaxial line, above ground. Due to the length of coaxial line between externally located Zn and the bridge proper, there will ordinarily be an impedance transformation (unless the line is exactly in integral number of half-wavelengths long) which will cause Zn to be modified over the value it would have had if it were actually present in the box. This feature may be used to advantage to achieve the same variation with frequency as is found in the receiver impedance at the end of its line. Of course, if the receiver is matched to its coaxial line 31, the impedance Zn need only be matched to its line; the bridge ratio is then fixed by the ratio of the surge impedances of the two coaxial lines 31 and 65. It should be noted that a metallic partition 66 in the enclosure 23 of Fig. 6a separates and shields one-half of the bridge from the other half.

Figure 7A:
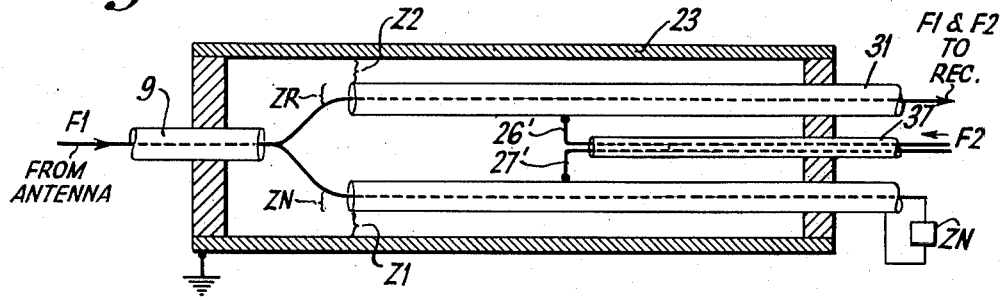
Figure 7B:
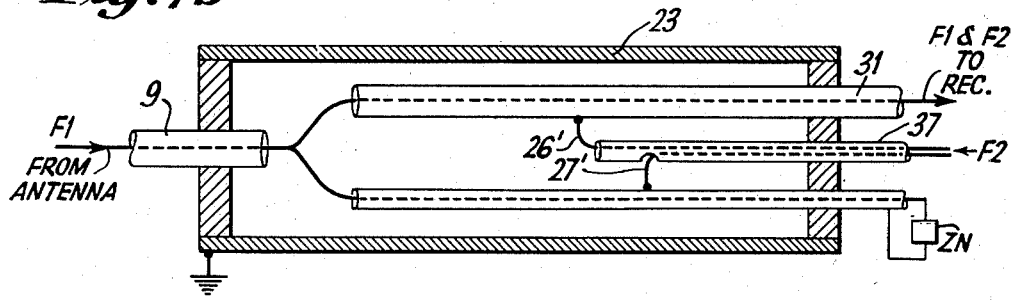

Figs. 7a and 7b illustrate two advantageous circuit arrangements of the present invention. Fig. 7a shows a perfectly symmetrical equal-ratio-arm bridge arrangement while Fig. 7b shows an unequal-ratio-arm bridge. These circuits of Figs. 7a and 7b avoid the complications of local oscillator injection through a coaxial line as illustrated in Figs. 4c to 6b inclusive by using a balanced, two-wire line 26', 27' shielded by an outer conductor 37. The impedances Z1 and Z2 are formed by the projections of the coaxial lines from the receiver and from the externally located neutralizing impedance Zn into the metal enclosure 23. These projections are not critical in length. As heretofore mentioned, balance may be achieved either by adjustment of impedance Zn or by plunger adjustments of Z1 and Z2 in the manner generally illustrated in Fig. 4a. In view of the similarity of the circuits of Figs. 7a and 7b to the bridges previously discussed, it is believed that the operation of these bridge arrangements will be evident without further exposition.

Figure 8:
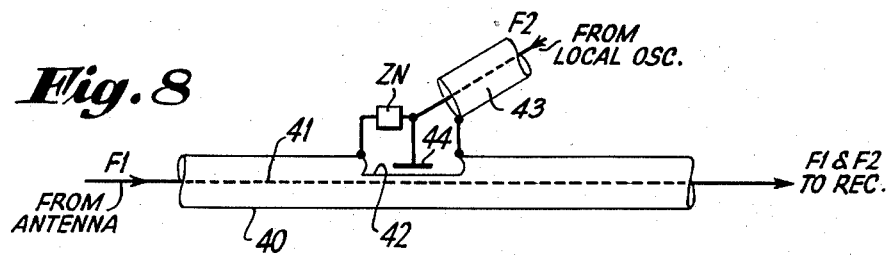
Fig. 8 is another embodiment of the invention.

Fig. 8 shows still another embodiment of the invention wherein a coaxial line 40, 41 extends between the antenna and the receiver. The inner conductor 41 of the coaxial line passes directly between the antenna and receiver. The outer conductor 40 is provided with a slot or small aperture 42 which is equivalent to an inductance. The local oscillator is coupled to the circuit by way of a coaxial line 43 whose inner conductor is connected to a probe 44 located in the aperture 42 and capacitively coupled to the inner conductor 41. The inner conductor of coaxial line 43 at the location of probe 44 is also connected through impedance ZN to the outer conductor 40. Impedance Zn must be proportional to the complex conjugate of the receiver impedance as seen from the bridge. If the receiver termination is a pure resistance, then ZN must also be a pure resistance. When properly adjusted, both signal and local oscillator are fed to the receiver, with no negligible power loss for the signal, but yet no local-oscillator power reaches the antenna.

Figure 8A:
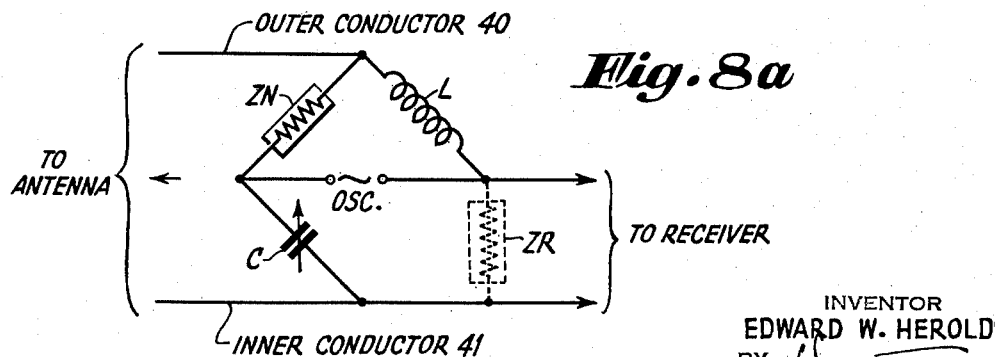
Fig. 8a is the electrical circuit equivalent of Fig. 8.

The equivalent electrical circuit for the bridge circuit of Fig. 8 is shown in Fig. 8a. The bridge arm L corresponds to the inductance formed by the aperture or slot 42. The capacitance C corresponds to the capacitance between probe 44 and the inner conductor 41 and is variable by moving the position of the probe relative to inner conductor 41 to balance the bridge. The conditions for balance are $$Z_N Z_R = \frac{L}{C}$$

where ZR is the receiver impedance as seen looking from the bridge toward its transmission line. For the reasons given above in connection with Fig. 6, it may be advantageous to use a coaxial transmission line to a remote impedance Z'n in place of the lumped element ZN. In this way, variations of receiver impedance with frequency due to its transmission line can be compensated for over a wide band by introducing compensating variations by means of a transmission line to Z'n. By making the transmission line to Z'n a quarter-wavelength longer than that to the receiver, a balance can be achieved (at one frequency) when Z'n=ZR. Other variations of the bridge arrangement are readily devised by those skilled in the art by making use of the balance condition.

What is claimed is:

1. A bridge circuit for use at ultra high frequencies, comprising a metallic enclosure closed on all sides, a first section of coaxial line projecting into said enclosure and extending externally of said enclosure for coupling to a source of ultra high frequency energy, a second section of coaxial line also projecting into said enclosure and extending externally of said enclosure for coupling to a utilization circuit whose input is adapted to comprise one arm of said bridge circuit, a direct connection within said enclosure between the inner conductors of said coaxial lines, a two-conductor line adapted to extend to another source of high frequency energy of a frequency different from that of said first source, a neutralizing impedance, means connecting one conductor of said two-conductor line through said neutralizing impedance to said direct connection, means connecting the other conductor of said two-conductor line to the outer conductor of said second coaxial line, said metallic enclosure surrounding and having walls engaging the outer conductors of said first and second sections of coaxial line.

2. A bridge circuit for use at ultra high frequencies, comprising a metallic enclosure closed on all sides, a first section of coaxial line projecting into said enclosure through one metallic wall thereof and extending externally of said enclosure for coupling to a source of ultra high frequency energy, a second section of coaxial line extending in the same general direction as said first line also projecting into said enclosure but through an oppositely disposed metallic wall thereof and extending externally of said enclosure for coupling to a utilization circuit whose input is adapted to comprise one arm of said bridge circuit, a direct connection within said enclosure between the inner conductors of said coaxial lines, a two-conductor line adapted to extend to another source of high frequency energy of a frequency different from that of said first source, a neutralizing impedance, means connecting one conductor of said two-conductor line through said neutralizing impedance to said direct connection, and means connecting the other conductor of said two-conductor line to the outer conductor of said second coaxial line, said metallic walls of said enclosure respectively engaging said outer conductors of said sections of coaxial line, said enclosure surrounding said sections of coaxial line.

3. A bridge circuit in accordance with claim 1, characterized in this, that said two-conductor line is a coaxial line, and said neutralizing impedance is a lumped circuit constant located within said enclosure.

4. A bridge circuit for use at ultra high frequencies, comprising a metallic enclosure, a first coaxial line projecting into said enclosure and adapted to be coupled externally of said enclosure to a source of ultra high frequency energy, a second coaxial line also projecting into said enclosure and extending externally of said enclosure for coupling to a utilization circuit whose input is adapted to comprise one arm of said bridge circuit, a two-conductor line extending into said enclosure and adapted to be coupled externally of said enclosure to another source of high frequency energy of a frequency different from that of said first source, said second coaxial line projecting into said enclosure for a distance approximately equal to one-quarter of a wavelength at the operating frequency of said other source, a direct connection within said enclosure between the inner conductors of said first and second coaxial lines, a neutralizing impedance, means connecting one conductor of said two-conductor line through said neutralizing impedance to said direct connection, and means connecting the other conductor of said two-conductor line to the other conductor of said second coaxial line.

5. A bridge circuit for use at ultra high frequencies, comprising a metallic enclosure closed on all sides, a first section of coaxial line projecting into said enclosure and coupled externally of said enclosure to a source of ultra high frequency energy, a second section of coaxial line also projecting into said enclosure and coupled externally of said enclosure to a utilization circuit, a direct connection within said enclosure between the inner conductors of said first and second coaxial lines, a neutralizing impedance, a third section of coaxial line projecting into said enclosure and coupled externally of said enclosure to said neutralizing impedance, a lead connecting one conductor of said third coaxial line to said direct connection, a two-conductor line extending into said enclosure and coupled externally of said enclosure to a second source of high frequency energy of a frequency different from said first source, a connection from one conductor of said two-conductor line to the outer conductor of said second coaxial line, and a connection from the other conductor of said two-conductor line to the other conductor of said third coaxial line, said metallic enclosure surrounding said sections of line and having metallic walls engaging the outer conductors of said sections at points removed from the open ends thereof, whereby the spacing between said enclosure and the outer conductors of said second and third sections of line comprise impedances forming arms of said bridge circuit.

6. A bridge circuit as defined in claim 5 characterized in this, that said third coaxial line projects into said enclosure for a distance approximately equal to one-quarter of a wavelength at the operating frequency of said second source.

7. A bridge circuit as defined in claim 5, characterized in this, that a shield surrounds said two-conductor line within said enclosure.

8. A bridge circuit as defined in claim 2, characterized in this, that said two-conductor line is a coaxial line extending parallel to but spaced from said second coaxial line within said enclosure, and having an outer conductor whose diameter is smaller than the diameter of the outer conductor of said second coaxial line.

9. A bridge circuit for use at ultra high frequencies, comprising a metallic enclosure closed on all sides, a first coaxial line projecting into said enclosure from one end thereof and adapted to be coupled externally of said enclosure to a source of ultra high frequency energy, a second coaxial line projecting into said enclosure from the opposite end thereof and adapted to be coupled externally of said enclosure to a receiver, a direct connection within said enclosure between the inner conductors of said first and second coaxial lines, a third coaxial line projecting into said enclosure through said last end thereof and extending parallel to but spaced from said second coaxial line, a lead connecting the inner conductor of said third coaxial conductor to the inner conductors of said first and second coaxial lines, a neutralizing impedance, said third coaxial line being coupled externally of said enclosure to said neutralizing impedance, a shielded two-conductor line entering said enclosure through said last end and having different conductors connected to different outer conductors of said second and third coaxial lines, all of said lines being spaced from the side walls of said enclosure in the interior thereof.

10. A bridge circuit as defined in claim 9, characterized in this, that the diameter of said third coaxial line is smaller than the diameter of said second coaxial line.

11. A bridge circuit as defined in claim 9, including means for adjusting the impedances constituting certain arms of said bridge.

12. A bridge circuit for use at ultra high frequencies, comprising a metallic enclosure closed on all sides to minimize radiation, a first coaxial line projecting into said enclosure and coupled externally of said enclosure to a source of ultra high frequency energy, a second coaxial line also projecting into said enclosure and adapted to be coupled externally of said enclosure to a utilization circuit whose input comprises one arm of said bridge circuit, a direct connection within said enclosure between the inner conductors of said first and second coaxial lines, a third coaxial line projecting into said enclosure and coupled externally of said enclosure to a neutralizing impedance, a lead connecting one conductor of said third coaxial line to said direct connection, a two-conductor line extending into said enclosure and adapted to be coupled externally of said enclosure to a second source of high frequency energy of a frequency different from said first source, a shield surrounding said two-conductor line, a connection from one conductor of said two-conductor line passing through said shield to the outer conductor of said second coaxial line, and a connection from the other conductor of said two-conductor line to the other conductor of said third coaxial line.

13. A bridge circuit for use at ultra high frequencies, comprising a metallic enclosure closed on all sides to minimize radiation, a first coaxial line projecting into said enclosure and coupled externally of said enclosure to a source of ultra high frequency energy, a second coaxial line also projecting into said enclosure and adapted to be coupled externally of said enclosure to a utilization circuit whose input comprises one arm of said bridge circuit, a direct connection within said enclosure between the inner conductors of said first and second coaxial lines, a third coaxial line projecting into said enclosure and coupled externally of said enclosure to a neutralizing impedance, a lead connecting one conductor of said third coaxial line to said direct connection, a fourth coaxial line extending into said enclosure and adapted to be coupled externally of said enclosure to a second source of high frequency energy of a frequency different from said first source, said fourth coaxial line having an outer conductor whose diameter is different from the diameter of the outer conductor of said second coaxial line, a connection from the inner conductor of said fourth coaxial line to the outer conductor of said second coaxial line, and a connection within said enclosure from the outer conductor of said fourth coaxial line to the other conductor of said third coaxial line.

14. A bridge circuit as defined in claim 13, characterized in this, that said first and third coaxial lines pass into said enclosure through one end wall, while said second and fourth coaxial lines pass into said enclosure through the opposite end wall.

15. A bridge circuit as defined in claim 13, including a metallic partition within said enclosure separating said first and third coaxial lines from said second and fourth coaxial lines.

16. Means for reducing the local oscillator radiation from a superheterodyne receiver to which an antenna is coupled, comprising a radio frequency bridge circuit having four effective arms within a metallic enclosure, one of said arms comprising a first coaxial line leading to the input impedance of said receiver, a second arm comprising a second coaxial line coupled to a neutralizing impedance, a third arm being reactive and formed by an extension of the outer conductor of the first coaxial line into said metallic enclosure, and a fourth arm being reactive and formed by an extension of the second coaxial line into the same enclosure, and means for coupling opposite diagonals of said bridge circuit to said antenna and to a source of local oscillations, respectively.

17. Means for reducing the local oscillator radiation from a superheterodyne receiver to which an antenna is coupled, comprising a radio frequency bridge circuit having four effective arms within a metallic enclosure, one of said arms comprising a first coaxial line leading to the input impedance of said receiver, a second arm comprising a second coaxial line coupled to a neutralizing impedance, a third arm being reactive and formed by an extension of the outer conductor of the first coaxial line into said metallic enclosure, and a fourth arm being reactive and formed by an extension of the second coaxial line into the same enclosure, the reactance of said third and fourth reactive arms being unequal in magnitude, and means for coupling opposite diagonals of said bridge circuit to said antenna and to a source of local oscillations, respectively.

18. Apparatus as defined in claim 17, characterized in this, that said two coaxial lines have different diameters.

19. Apparatus as defined in claim 17, characterized in this, that there are different spacings between the walls of the enclosure and said extensions.

20. Apparatus as defined in claim 16 in which the output of said local oscillator is connected between a tap on one reactive arm and a tap on the other, while the coaxial line from the antenna is connected across a diagonal of the bridge.

21. A bridge circuit for use at ultra high frequencies, comprising a metallic enclosure closed on all sides to minimize radiation, a first coaxial line projecting into said enclosure and adapted to be coupled externally of said enclosure to a source of ultra high frequency energy, a second coaxial line also projecting into said enclosure and adapted to be coupled externally of said enclosure to a utilization circuit whose input comprises one arm of said bridge circuit, a direct connection within said enclosure between the inner conductors of said first and second coaxial lines, a third coaxial line projecting into said enclosure and coupled externally of said enclosure to a neutralizing impedance, a lead connecting one conductor of said third coaxial line to said direct connection, a two-conductor line extending into said enclosure and coupled externally of said enclosure to a second source of high frequency energy of a frequency different from said first source, a connection from one conductor of said two-conductor line to the outer conductor of said second coaxial line, and a connection from the other conductor of said two-conductor line to the other conductor of said third coaxial line.

22. A bridge circuit for use at ultra high frequencies, comprising a metallic enclosure closed on all sides to minimize radiation, a first coaxial line projecting into said enclosure and adapted to be coupled externally of said enclosure to a source of ultra high frequency energy, a second coaxial line also projecting into said enclosure and coupled externally of said enclosure to a utilization circuit whose input comprises one arm of said bridge circuit, a direct connection within said enclosure between the inner conductors of said first and second coaxial lines, a third coaxial line projecting into said enclosure and coupled externally of said enclosure to a neutralizing impedance, a lead connecting one conductor of said third coaxial line to said direct connection, a fourth shielded line extended into said enclosure and coupled externally of said enclosure to a second source of high frequency energy of a frequency different from said first source, said fourth line having two conductors and an overall outer diameter which is different from the diameter of the outer conductor of said second coaxial line, a connection from one conductor of said fourth line to the outer conductor of said second coaxial line, and a connection within said enclosure from the other conductor of said fourth line to the other conductor of said third coaxial line.

23. A bridge circuit for use at ultra high frequencies, comprising a metallic enclosure closed on all sides to minimize radiation, a first coaxial line projecting into said enclosure and adapted to be coupled externally of said enclosure to a source of ultra high frequency energy, a second coaxial line also projecting into said enclosure and adapted to be coupled externally of said enclosure to a utilization circuit whose input comprises one arm of said bridge circuit, a direct connection within said enclosure between the inner conductors of said first and second coaxial lines, a third coaxial line projecting into said enclosure and coupled externally of said enclosure to a neutralizing impedance, a lead connecting the inner conductor of said third coaxial line to said direct connection, a two-conductor line extending into said enclosure and coupled externally of said enclosure to a second source of high frequency energy of a frequency different from said first source, a connection from one conductor of said two-conductor line to the outer conductor of said second coaxial line, and a connection from the other conductor of said two-conductor line to the outer conductor of said third coaxial line.

EDWARD W. HEROLD.

REFERENCES CITED

The following references are of record in the file of this patent:

UNITED STATES PATENTS

| Number | Name | Date |
| --- | --- | --- |
| 2,341,408 | Lindenblad | Feb. 8, 1944 |
| 2,416,577 | Fyler | Feb. 25, 1947 |
| 2,428,831 | Brown et al. | Oct. 14, 1947 |
| 2,436,830 | Sharpless | Mar. 2, 1948 |
| 2,441,452 | Strutt et al. | May 11, 1948 |
| 2,453,078 | Posthumus | Nov. 2, 1948 |
| 2,455,657 | Cork et al. | Dec. 7, 1948 |
| 2,469,222 | Atwood et al. | May 3, 1949 |
| 2,485,031 | Bradley | Oct. 18, 1949 |
| 2,507,915 | Lindenblad | May 16, 1950 |